Jan. 24, 1967  D. M. GREY  3,300,059
BALE STACKING MACHINE
Filed April 12, 1965  4 Sheets-Sheet 1

INVENTOR.
DONALD M. GREY
BY
Lyon + Lyon
ATTORNEYS

Jan. 24, 1967   D. M. GREY   3,300,059
BALE STACKING MACHINE
Filed April 12, 1965   4 Sheets-Sheet 2
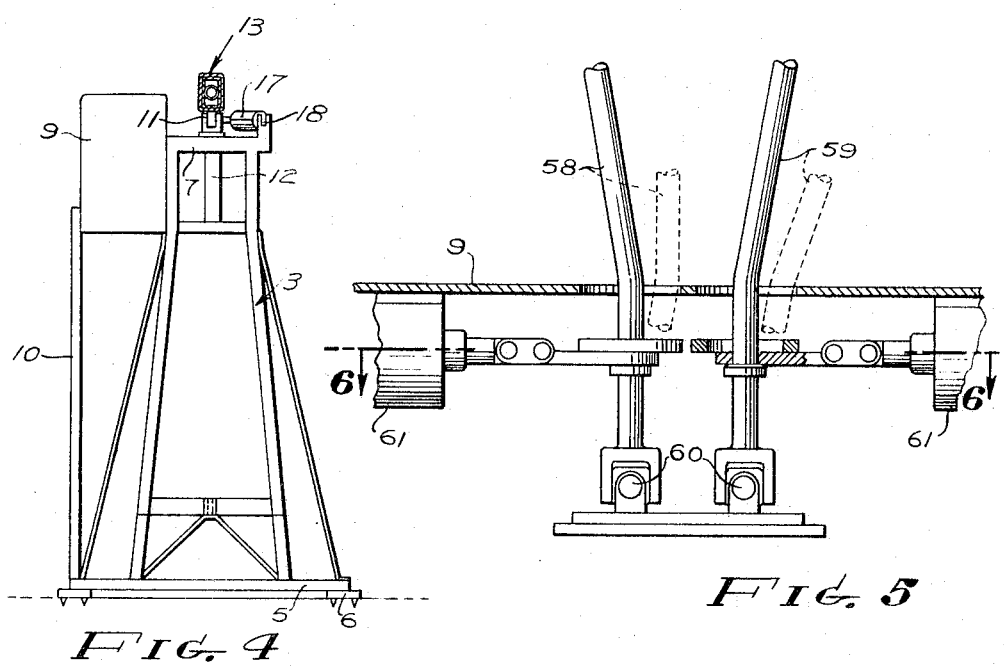
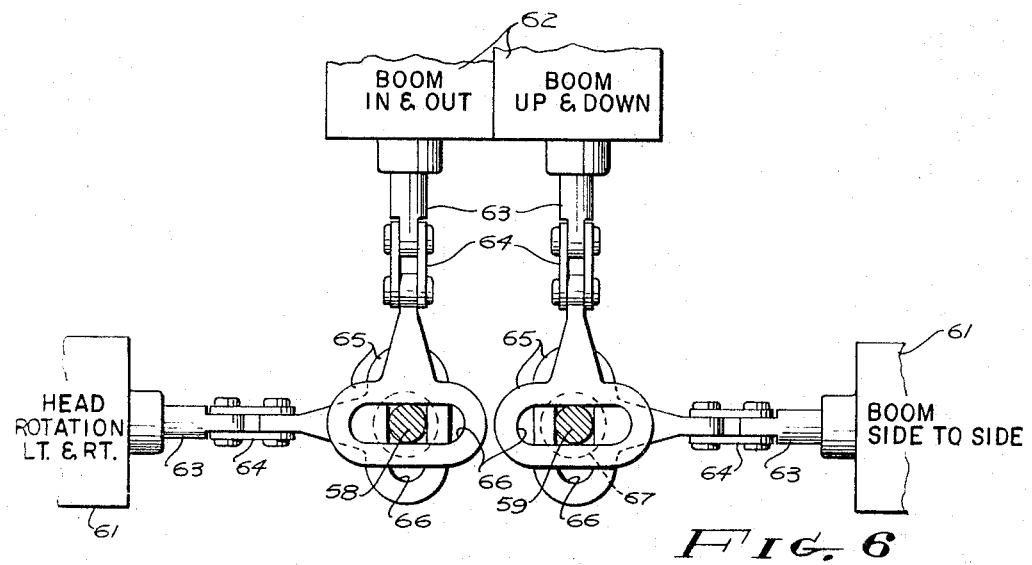
INVENTOR.
DONALD M. GREY
BY Lyon & Lyon
ATTORNEYS

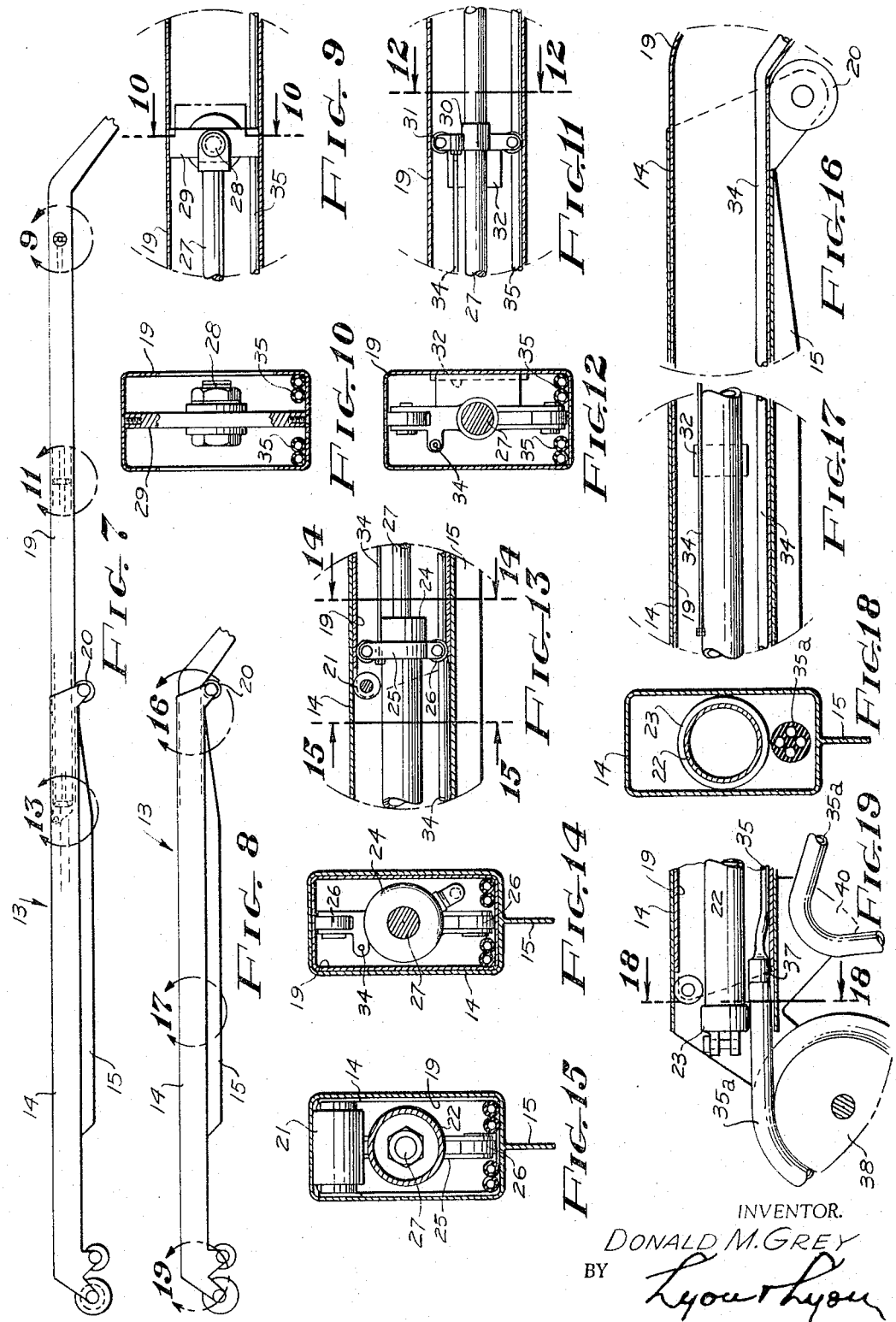

Jan. 24, 1967 D. M. GREY 3,300,059
BALE STACKING MACHINE
Filed April 12, 1965 4 Sheets-Sheet 4

INVENTOR.
DONALD M. GREY
BY Lyon+Lyon
ATTORNEYS

United States Patent Office 3,300,059
Patented Jan. 24, 1967

3,300,059
BALE STACKING MACHINE
Donald M. Grey, Fresno, Calif.
(12739 S. Bethel, Selma, Calif. 93662)
Filed Apr. 12, 1965, Ser. No. 447,576
12 Claims. (Cl. 212—35)

This invention relates to bale stacking machines, and included in the objects of this invention are:

First, to provide a bale stacking machine which is readily attached to a farm tractor for movement from place-to-place and which is adapted to engage as many as four bales by their adjacent corners, and elevate, rotate and otherwise manipulate the bales of hay between a truck or the like and a stack of baled hay.

Second, to provide a bale stacking machine which incorporates a novelly arranged extensible boom involving an enlongated cylinder and stem with novel means for providing support for the stem when extended.

Third, to provide a bale stacking machine wherein a frame structure, including a control station, extends upwardly from the rear end of the tractor and supports an extensible boom and operating means therefor to move the boom between a downwardly directed position forward of the tractor and an upwardly directed position, as well as to move the boom from side-to-side, the operator being seated in the elevated control station to provide uninterrupted view of the stacking operation.

Fourth, to provide a bale stacking machine which incorporates a novelly arranged bale carrying head capable of a full rotation to permit orientation of the bales in any direction, to connection between the boom and the bale carrying head being so arranged as to permit stacking of the bales close to an overlying roof.

Fifth, to provide a bale stacking machine which incorporates a novelly arranged control means involving only two handles movable in cross patterns to effect eight movements; namely, extension, retraction, upward, downward and side movements of the boom and rotation of the bale carrying head in either direction.

Sixth, to provide a machine which, though primarily adopted for the stacking of bales, may be arranged for other material handling operations such as, but not limited to, the handling of fruit baskets in orchards, or manure handling.

With the above and other objects in view, as may appear hereinafter, reference is directed to the accompanying drawings in which:

FIGURE 4 is a rear view of the bale stacking machine with the tractor removed, the view being taken from 4—4 of FIGURE 3.

FIGURE 5 is an enlarged fragmentary sectional view taken through 5—5 of FIGURE 2 showing the control means for the machine.

FIGURE 6 is a further enlarged fragmentary sectional view taken through 6—6 of FIGURE 5.

FIGURE 7 is a side view of the boom shown in its extended position, and with the tip end shown fragmentarily.

FIGURE 8 is a similar side view of the boom with the boom shown in its retracted position.

FIGURE 9 is an enlargd, fragmentary sectional view of the boom taken within circle 9 of FIGURE 7.

FIGURE 10 is a further enlarged transverse sectional view thereof taken through 10—10 of FIGURE 9.

FIGURE 11 is an enlarged fragmentary sectional view of the boom taken within circle 11 of FIGURE 7.

FIGURE 12 is a further enlarged transverse sectional view taken through 12—12 of FIGURE 11.

FIGURE 13 is an enlarged fragmentary sectional view of the boom taken within circle 13 of FIGURE 7.

FIGURE 14 is a further enlarged transverse sectional view thereof taken through 14—14 of FIGURE 13.

FIGURE 15 is another transverse sectional view taken through 15—15 of FIGURE 13.

FIGURE 16 is a fragmentary sectional view of the boom taken within circle 16 of FIGURE 18.

FIGURE 17 is a fragmentary sectional view of the boom taken within circle 17 of FIGURE 8.

FIGURE 18 is a further enlarged transverse sectional view taken through 18—18 of FIGURE 19.

FIGURE 19 is a fragmentary sectional view of the boom taken within circle 19 of FIGURE 8.

Figure 1:
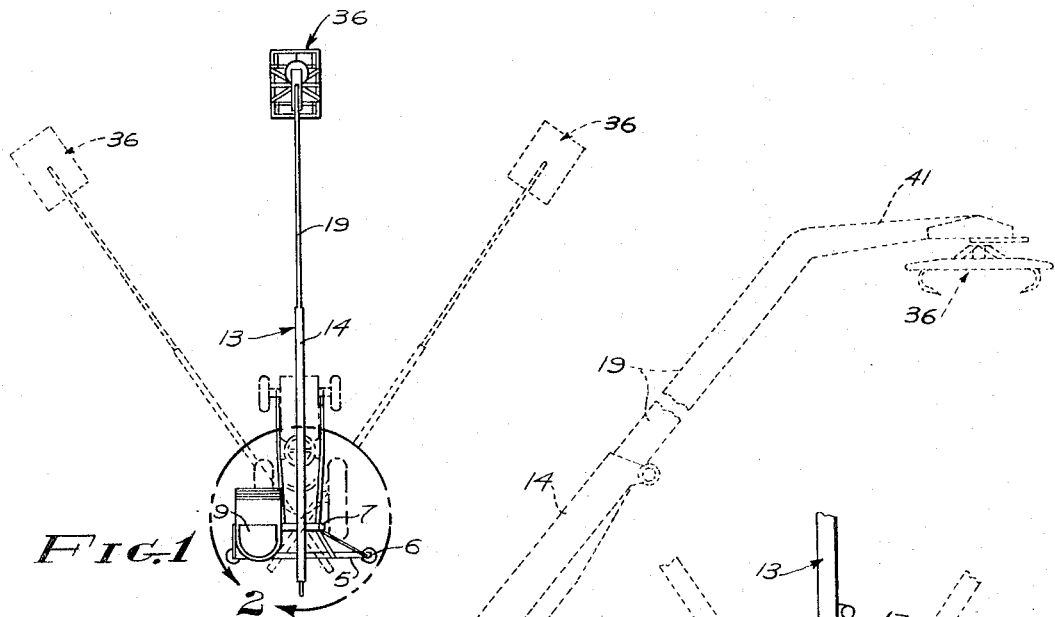
FIGURE 1 is a substantially diagrammatical plan view of the bale stacking machine shown mounted on a tractor and indicating the lateral range of movement of the bale carrying head in its extended position.

The bale stacking machine is adapted to be mounted on a conventional farm tractor 1. Tractors of this type are provided with lifting arms 2 or the like arranged to be attached to various machines or implements which are intended for attachment to the tractor. The conventional farm tractor also includes a power take-off, not shown.

The bale stacking machine includes an upright frame structure 3 having near its lower end, suitable means 4 for attachment to the lifting arm 2. Such means may include struts or arms having openings aligned with an opening in the lifting arm 2 through which a pin is inserted. The lower end of the frame structure terminates in a transversely extending base bar 5 disposed rearwardly of the rear tractor wheels and extending laterally a sufficient distance to provide lateral stability. The extremities of the base bar are provided with feet 6 having prongs which may be pressed into the earth to anchor the frame structure. The upper end of the frame structure terminates in a horizontal cross bar 7 and near its upper end, the frame structure is pivotally connected to struts 8 which extend downwardly and forwardly and are joined to the sides of the tractor near its forward end.

Secured to one side of the frame structure is a control station 9 comprising a seat and foot supporting means. The control station is accessible by a ladder 10 secured to one side of the frame structure.

Figure 2:
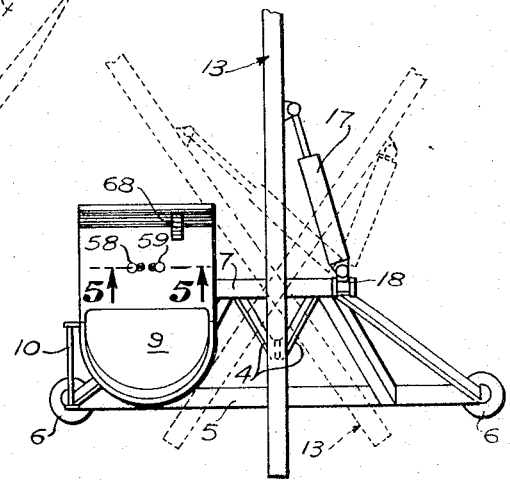
FIGURE 2 is an enlarged fragmentary plan view taken within circle 2 of FIGURE 1.
Figure 3:
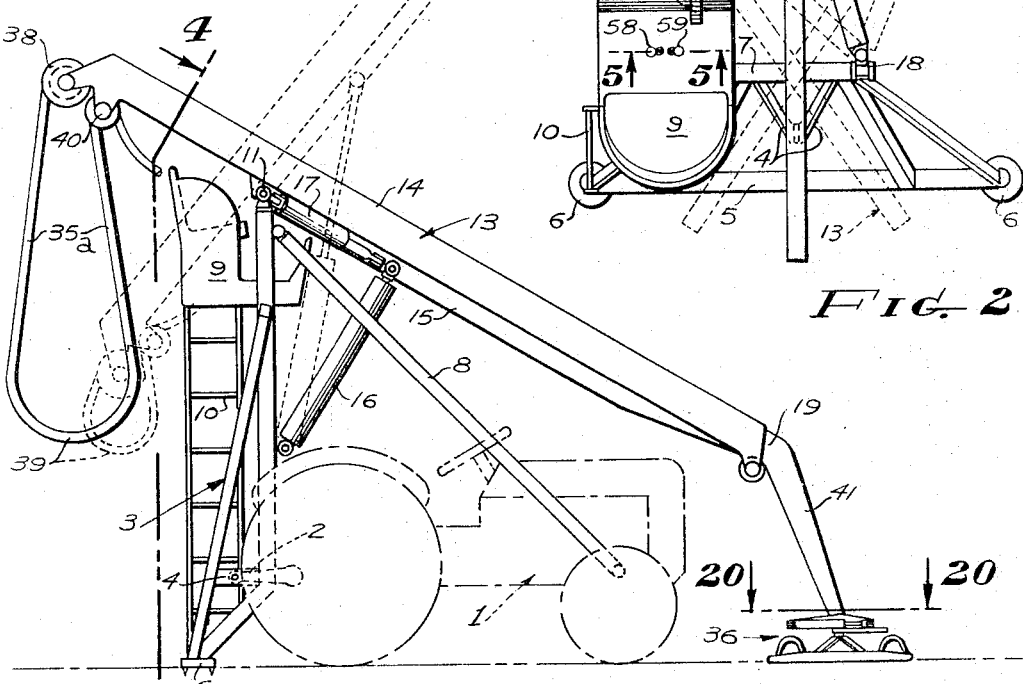
FIGURE 3 is an enlarged side view thereof showing the boom in its retracted position by solid lines and in an elevated extended position by dotted lines.

The cross bar 7 at the upper end of the frame structure is provided with a pivot structure including a horizontal pivot 11 and a vertical pivot 12. The pivot structure is employed to operate an extensible boom 13 which includes an outer sleeve 14 having a longitudinally extending bottom rib 15 journalled in the horizontal pivot 11. The exensible boom is therefore pivotable about a horizontal axis and about a vertical axis as indicated in FIGURES 1, 2 and 3.

Movement of the boom is accomplished by a vertically operating power cylinder unit 16, one end of which is attached to the frame structure 3 and the other end of which is attached to the rib 15. Lateral movement is obtained by a laterally operating power cylinder unit 17, one end of which is pivotally connected to the rib 15 and the other end of which is pivotally connected to a pivot means 18 having a second or horizontal pivotal axis coaxial with the horizontal axis of the pivot 11 and mounted at one lateral extremity of the cross bar 7.

The extensible boom also includes an inner sleeve 19. Both sleeves are rectangular in cross section and the inner sleeve fits snugly but slidably within the outer sleeve. At its extended end the outer sleeve 14 is provided with a roller 20 for engaging the underside and for operating the inner sleeve as shown particularly in FIGURE 8. The inner extremity of the inner sleeve is also provided with a roller 21, which bears against the upper side of the outer sleeve 14 as shown in FIGURES 13 and 15.

Mounted within the extensible boom is an enlongated power cylinder unit 22 having a head end bracket 23 secured to the rear end of the outer sleeve 14 as shown best in FIGURE 19. The other or extended end 24 of the power cylinder unit 22 is provided with a collar 25 having rollers 26 which engage the inner walls of the inner sleeve as shown in FIGURES 13 and 14.

The power cylinder unit 22 receives an elongated shaft 27, the extremity of which is connected by a cross pin 28 to a mounting bar 29 located near the extremity of the inner sleeve 19 as shown best in FIGURE 9. Slidably mounted on the shaft 27 is a supporting collar 30 having upper and lower extensions terminating in rollers 31 which engage the upper and lower walls of the inner sleeve as shown in FIGURES 11 and 12. Fastened to the midportion of the inner sleeve 19 is a side plate 32. Extending laterally from the collar 30 is a side flange 33 which overlaps the side plate 32 so as to be engaged by the side plate. Also attached to the collar 30 is a slide rod 34 which parallels the shaft 27 and is slidably secured in the collar 25 at the extended end of the power cylinder unit 22.

When the inner sleeve 19 is extended, the supporting collar 30 normally tends to move with the shaft 27 due to the fact that the rolling friction of the rollers 31 is less than the sliding friction of the collar on the shaft; however, the collar 30 cannot move beyond the extended movement of the inner sleeve and shaft because of the slide rod 34.

Should the collar tend to remain adjacent the end of the cylinder end 24, the side plate 32 engages the side flange 33, after the inner sleeve 19 and shaft 27 have completed half their travel, and moves the supporting collar forwardly. As a result, the shaft 27 is supported at its midpoint when the inner sleeve is fully extended as shown in FIGURES 7, 11 and 12.

When the inner sleeve 19 and shaft 27 is retracted, the supporting collar 30 may retract with the shaft 27, but should it fail to do so, the collar 30 is eventually engaged by the mounting bar 29 and returned to the end 24 of the cylinder 23.

Extending along the bottom sides of the outer sleeve 14 and inner sleeve 19 are hydraulic control lines 35 which lead to the extremity of the boom and to a bale carrying head 36. Those portions of the line within the inner sleeve 19 may be rigid tubes. At the rear end of the inner sleeve the control lines 35 are joined to a multiple duct pressure hose 35a, through a suitable adapter 37. The pressure hose 35a extends rearwardly from the outer sleeve 14 and over a guide pulley 38, shown particularly in FIGURES 3 and 19. The pressure hose forms a depending loop 39 ending at a suitable anchor 40 or other securing means so that as the boom is extended, the loop contracts and as the boom is retracted, the loop expands as indicated by solid lines and dotted lines in FIGURE 3.

The extremity of the inner sleeve is provided with an angularly directed tip portion 41, which is joined to a short beam 42 by means of a pivot connection 43. The beam 42 forms a part of the bale carrying head 36. The beam is journalled intermediate its ends to a vertical shaft 44 which is joined to a rectangular frame 45 by diverging angular struts 46.

Near its ends, the frame 45 is provided with a pair of tine bars 47, the ends of which fit in bearings 48. Each tine bar carries a set of U-shaped tines 49 having pointed tips. The tines rotate approximately 90° from a retracted position shown in FIGURE 21 in which the tips of the tines are within the boundaires of the frame 45 and in extended position as shown in FIGURE 22 wherein the points of the tines are directed toward each other. Each tine bar is provided with a lever arm 50.

Pivotally supported between the lever arms 50 is a power cylinder unit 51 capable of extension and retraction to pivot the tine bars in opposition. The vertical shaft 44 immediately below the beam 42 is provided with a small driven sprocket 52 and one end of the beam supports a larger drive sprocket 53. The sprockets are connected by a chain 54.

Figure 20:
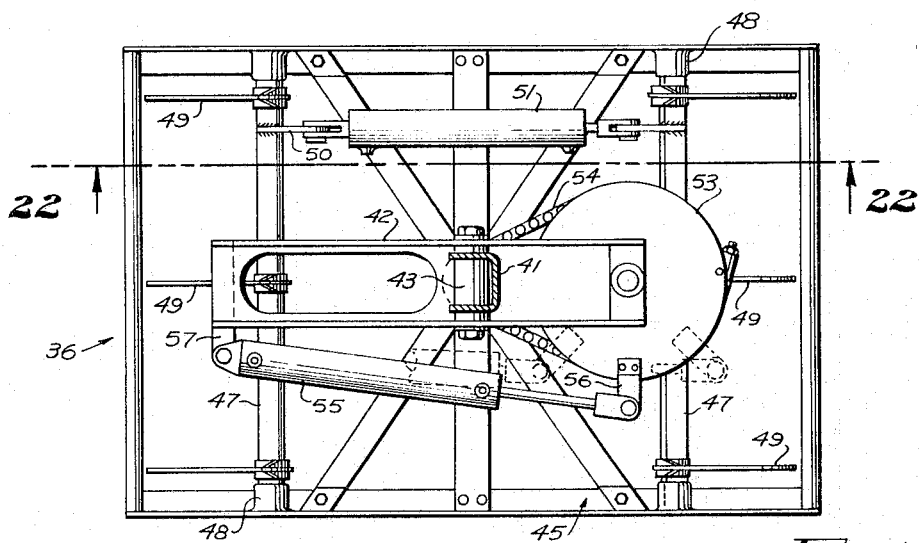
FIGURE 20 is a sectional view taken through 20—20 of FIGURE 3 showing the bale carrying head.

The power cylinder unit 55 is connected at one end by a bracket 56 to the drive sprocket 53 and at its other end by a bracket 57 to the beam 42 so that as the power cylinder unit is extended or retracted, the drive sprocket 53 is rotated through a part circle, for example, the rotation may be approximately 90° as indicated by the dotted lines in FIGURE 20. The ratio between the diameters of the drive and driven sprockets is such that partial rotation of the drive sprocket effects a full rotation of the driven sprocket and the frame 45 of the bale carrying head, in fact, the rotation is preferably in excess of a full circle.

Hydraulic power to manipulate the various components of the bale stacking machine is obtained from a conventional hydraulic pump driven in a conventional manner from the power take-off of the tractor. Motive fluid is supplied to the various power cylinder units from the hydraulic pump through conventional four-way valves, the supply lines being connected to the extremities of each power unit so that each power unit may be extended and retracted.

A relatively simple, but unique means is provided to effect control of the various components of the machine. Located at the control station 9 in front of the operator's seat is a pair of vertically extending control levers 58 and 59. The lower ends of the control levers are connected to the frame structure 3 by universal joints 60. A pair of axially aligned confronting four-way control valves 61 is disposed at opposite sides of the control levers near the universal joints 60. A second pair of control valves 62 is disposed parallel to each other, each in alignment with a control lever 58 or 59 and at like angles to the control valve 61.

Each control valve is provided with a stem 63 which is connected by a link 64 to a head 65 having a cross slot 66 therein. Each control lever extends through the cross slots of a pair of heads 65 associated with two right angularly disposed control valves 61 and 62 as shown in FIGURE 6. Each cross slot is greater in length than the length of travel of the stem of the right angularly related control valve. Thus, if a control lever is pivoted in one plane corresponding to the axis of a stem 63, the associated control valve is operated, but the right angularly positioned control valve is unaffected.

The control valves may be associated with the power cylinder units in various ways. One said arrangement is to use one control valve 61 for side-to-side operation of the boom through the power cylinder 17 and to utilize the opposing control valve 62 for rotation of the bale carrying head 36. The two parallel control valves 61 and 62 may control vertical or up and down movement of the boom and extension and retraction of the boom, the first being connected to the power cylinder unit 16 and the second being connected to the power cylinder unit 22.

The universal joints 60 and the limits of travel of the stems 63 permit excursions of the control levers 58 and 59 essentially in the plane designed by the heads 65 to broken line circles indicated by 67 in FIGURE 6 of the drawings.

To effect operation of the tines, a foot pedal 68 may be provided which operates an appropriate control valve, not shown.

Operation of the bale stacking machine is as follows:
The machine is attached in a conventional manner to the lifting arm 2 of the tractor and the struts 8 are secured to the forward portion of the tractor. When the lifting arm 2 is in its raised position, the bale stacking machine may be transported by the tractor to the region of operation. The lifting arm is then manipulated to set the feet 6 firmly on the ground. In fact, some of the weight of the tractor may be transferred to the base bar 5 and the feet 6.

During operation of the machine, the tractor remains stationary and all operations are performed at the control station 9. The outer sleeve 14 of the extensible boom may be relatively long extending from a point forward of the tractor to a point rearwardly thereof. When retracted, the inner sleeve 19 may occupy the entire length of the outer sleeve. When extended, the inner sleeve need overlap the outer sleeve only a small percentage of its length so that a substantial reach may be provided for a machine of relatively small dimensions. Also, the boom may be provided with a substantial degree of vertical movement as well as lateral movement as indicated in FIGURES 1 and 3.

In the stacking of bales of hay, the bale carrying head is manipulated so as to straddle two bales of hay or to engage confronting corners of four bales of hay or may be employed to engage a single bale of hay. In each case, the head is brought into engagement with the bale or bales with the tines in their retracted position shown in FIGURE 21. The foot pedal 68 is then operated to cause the tines to rotate toward each other and into the hay so that the bale or bales are secured to the head 36. The load is then raised, lowered, rotated, extended or retracted as desired.

Figure 21:
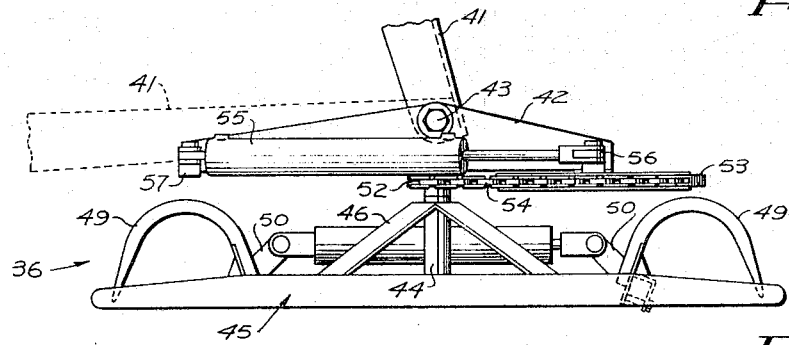
FIGURE 21 is a side view of the bale carrying head with the tip of the boom shown fragmentarily.
Figure 22:
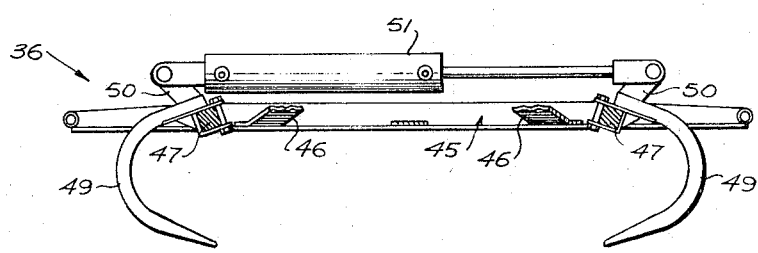
FIGURE 22 is a longitudinal sectional view of the bale carrying head taken through 22—22 of FIGURE 20.

It should be noted as indicated by dotted lines in FIGURES 3 and 21 that when the boom has been raised to its highest inclined position, the tip 41 is essentially horizontal so that the bales of hay may be stacked close to a roof overlying the stack of hay.

It will be noted that, by reason of the interconnection between the hand levers or control levers 58 and 59 and the control valves 61 and 62, all of the manipulative operations, except the grasping and releasing of the bales of hay, may be obtained by coordinate movement of the two levers. For example, the head may be rotated simultaneously with extension or retraction, raising, or lowering of the boom or side-to-side movement of the boom.

It should be noted that the bale carrying head is so arranged that its center-of-gravity is directly below the axis of the pin 43 so that the head tends to occupy a horizontal position irrespective of the angular position of the boom. When lifting a single bale of hay or when lifting two or four bales, the head is positioned in centered relation so that the center of gravity remains vertically below the pin 43.

If desired, suitable clamping means such as a dash pot or a friction means may be incorporated in the connection between the tip of the beam and the bale carrying head in order to minimize oscillation.

It should be noted that while the machine has been shown and described as a bale handling machine, it may be adapted to other material handling operations, for example, various heads may be substituted for the bale carrying head or the bale carrying head itself may be employed for other purposes.

While a particular embodiment of this invention has been shown and described, it is not intended to limit the same to the details of the construction set forth, but, instead, the invention embraces such changes, modifications and equivalents of the various parts and their relationships as come within the purview of the appended claims.

I claim:
1. An extensible boom comprising:
   (a) elongated telescoping sleeves;
   (b) an elongated hydraulic power cylinder and cooperating elongated shaft extending therefrom, said cylinder and shaft secured at the remote extremities of said sleeves to extend and retract said sleeves;
   (c) cylinder support means at the end of said cylinder from which said shaft issued, including rollers adapted to ride within the inner of said sleeves;
   (d) shaft support means mounted on said shaft and movable with respect to said shaft and said sleeves;
   (e) and means for positioning said shaft support means intermediate the ends of said shaft as said shaft is extended to restrain said shaft against buckling.

2. A material handling machine for attachment to a tractor having a lift arm, said machine comprising:
   (a) an upwardly extending rigid frame structure including laterally extending ground engaging feet fixed to the lower end of said frame structure, an operator's seat and control means at the upper end of said frame structure at one side thereof, and a beam pivot also at the upper end of said frame structure, said frame structure dimensioned to fit between the rear wheels of a tractor and further including means between said feet for attachment to said lift arm thereby to effect vertical movement of said frame structure between a raised position permitting transportation by said tractor, and a lower, fixed ground engaging position;
   (b) an extensible boom including an outer sleeve and an inner sleeve movable in said outer sleeve between a retracted and an extended position;
   (c) means pivotally connecting said outer sleeve to said beam pivot for arcuate movement about a horizontal and a vertical axis;
   (d) means connected to said frame structure and said boom for effecting said arcuate movements;
   (e) means within said sleeves for extending and retracting said inner sleeve with respect to said outer sleeve;
   (f) and a load carrying means connected to the extended end of said inner sleeve.

3. A material handling machine for attachment to a tractor having a lift arm, said machine comprising:
   (a) an upwardly extending rigid frame structure including laterally extending ground engaging feet fixed to the lower end of said frame structure, an operator's seat and control means at the upper end of said frame structure at one side thereof, and a beam pivot also at the upper end of said frame structure, said frame structure dimensioned to fit between the rear wheels of a tractor and further including means between said feet for attachment to said lift arm thereby to effect vertical movement of said frame structure between a raised position permitting transportation by said tractor, and a lower, fixed ground engaging position;
   (b) an extensible boom including an elongated outer sleeve, an elongated inner sleeve, slidable in said outer sleeve, a cylinder secured to said outer sleeve, and extending into said inner sleeve, and a shaft extenting from said cylinder and secured to the extended end of said inner sleeve, said cylinder and shaft cooperating to extend and retract said inner sleeve, said inner sleeve terminating in a downwardly directed extremity;
   (c) means pivotally connecting said outer sleeve to said beam pivot for arcuate movement about a horizontal and vertical axis;
   (d) means connected to said frame structure and said boom for effecting said arcuate movements;
   (e) and a load carrying means connected to the extended end of said inner sleeve.

4. A material handling machine for attachment to a tractor having a lift arm, said machine comprising:
   (a) an upwardly extending rigid frame structure including laterally extending ground engaging fixed to the lower end of said frame structure, an operator's seat and control means at the upper end of said frame structure at one side thereof, and a beam pivot also at the upper end of said frame structure, said frame structure dimensioned to fit between the rear wheels of a tractor and further including means between said feet for attachment to said lift arm thereby to effect vertical movement of said frame structure between a raised position permitting transportation by said tractor, and a lower, fixed ground engaging position;

(b) an extensible boom including an elongated outer sleeve, an elongated inner sleeve slidable in said outer sleeve, a cylinder secured to said outer sleeve and extending into said inner sleeve, rollers supporting the extended end of said cylinder with respect to said inner sleeve to permit axial movement of said inner sleeve relative to said cylinder, and an extensible and retractable shaft operatively connected with said cylinder and secured to the extended end of said inner sleeve;

(c) means pivotally connecting said outer sleeve to said beam pivot for arcuate movement about a horizontal and a vertical axis;

(d) means connected to said frame structure and said boom for effecting said arcuate movements;

(e) and a load carrying means connected to the extended end of said inner sleeve.

5. A material handling machine, comprising:
(a) a supporting frame structure;
(b) means on said frame structure for movement about a horizontal and a vertical axis;
(c) an extensible boom including an outer rectangular sleeve supported on said frame structure by said means, an inner rectangular sleeve axially slidable and guided within said outer sleeve between a retracted and an extended position;
(d) an elongated hydraulic power cylinder secured at one end to an end of said outer sleeve, its other end extending into said inner sleeve;
(e) means secured to the other end of said cylinder and movable with respect to said inner sleeve to support said other end of the cylinder in said inner sleeve;
(f) an elongated shaft operatively connected with said cylinder and secured at its extremity to the extended end of said inner sleeve;
(g) means movable in said inner sleeve and on said shaft for supporting said shaft intermediate its ends;
(h) and a load carrying means connected to the extended end of said inner sleeve.

6. A material handling machine, comprising:
(a) a supporting frame structure;
(b) means on said frame structure for movement about a horizontal and a vertical axis;
(c) an extensible boom including an outer rectangular sleeve supported on said frame structure by said means, an inner rectangular sleeve axially slidable and guided within said outer sleeve between a retracted and an extended position;
(d) an elongated hydraulic power cylinder within said sleeves and including an end secured to an end of said outer sleeve, and another end extending into said inner sleeve;
(e) means secured to the other end of said cylinder and movable with respect to said inner sleeve to support said other end of the cylinder in said inner sleeve;
(f) an elongated shaft operatively connected with said cylinder and secured at its extremity to the extended end of said inner sleeve;
(g) means movable in said inner sleeve and on said shaft for supporting said shaft intermediate its ends;
(h) a carrying head pivotally depending from the extremity of said inner sleeve;
(i) a hydraulic power cylinder carried by said head to manipulate said head;
(j) said extensible boom defining a passage extending longitudinally therethrough;
(k) a motive fluid line extending from said carrying head through said passage to the supported end of said boom, said motive fluid line depending in a loop from the supported end of said boom, and said loop being extensible and retractable as said boom is extended and retracted.

7. A material handling machine for attachment to a tractor having a lift arm, said machine comprising:
(a) an upwardly extending frame structure including laterally extending ground engaging feet, and means between said feet for attachment to said lift arm thereby to effect vertical movement of said frame structure between a raised position permitting transportation by said tractor, and a lower, fixed ground engaging position;
(b) braces extending between the upper end of said frame structure and said tractor;
(c) a pivot at the upper end of said frame structure;
(d) an operator's seat at one side of said pivot;
(e) a boom mounted on said pivot and extending forwardly thereof over said tractor;
(f) means including controls at said operator's seat for raising, lowering and turning said boom;
(g) and a load carrying means at the forward extended end of said boom.

8. An extensible boom comprising:
(a) an elongated outer sleeve;
(b) an elongated inner sleeve telescopable within the outer sleeve;
(c) a hydraulic cylinder and a shaft extensible from said cylinder and secured to said inner sleeve to extend and retract said inner sleeve, said cylinder secured to one end of said outer sleeve and extending to the other end thereof within said inner sleeve;
(d) bearing means at the extended end of said cylinder movable on the inner surface of said inner sleeve to permit extension and retraction of said inner sleeve;
(e) other bearing means longitudinally movable on said shaft and also longitudinally movable within said inner sleeve, said bearing means forming a support for said shaft to restrain said shaft against buckling;
(f) and means for limiting movement of said other bearing means to cause said other bearing means to occupy a position at the midportion of said shaft when said inner sleeve is fully extended.

9. An extensible boom comprising:
(a) an elongated outer sleeve;
(b) an elongated inner sleeve telescopable within the outer sleeve;
(c) a hydraulic cylinder, piston and thrust shaft unit within said inner sleeve, the cylinder and thrust shaft being substantially the length of said sleeves; said cylinder being secured to one end of said outer sleeve and said shaft being secured to the opposite end of said inner sleeve;
(d) rollers at the extended end of said cylinder adapted to permit extension and retraction of said inner sleeve while supporting the extended end of said cylinder;
(e) a support member for said thrust shaft including a sleeve for sliding movement on said shaft and rollers engageable with the walls of said inner sleeve to center said shaft therein;
(f) and means for urging said support member to the midportion of said shaft when said inner sleeve is fully extended.

10. An extensible boom comprising:
(a) an elongated outer sleeve;
(b) an elongated inner sleeve telescopable within the outer sleeve;
(c) a hydraulic cylinder, piston and thrust shaft unit within said inner sleeve, the cylinder and thrust shaft being substantially the length of said sleeves; said cylinder being secured to one end of said outer sleeve and said shaft being secured to the opposite end of said inner sleeve;
(d) rollers at the extended end of said cylinder adapted to permit extension and retraction of said inner sleeve while supporting the extended end of said cylinder;
(e) a support member for said thrust shaft including a sleeve for sliding movement on said shaft and rollers engageable with the walls of said inner sleeve to center said shaft therein;
(f) a projection on the inner wall of said inner sleeve engageable with said support member;
(g) a connecting rod between said support member and said cylinder;
(h) said projection being so located and the rod being of such length as to urge said support member to the midportion of said shaft when said inner sleeve is fully extended.

11. A device for picking up hay bales and depositing them on top of a previously constructed bale stack, wherein some of the bales are positionable on said stack transverse to other positioned bales whereby an interlocking arrangement results resisting toppling of the stack, and wherein the device is attachable to a tractor having a lift arm, said device comprising:
(a) an upwardly extending rigid frame structure including laterally extending ground engaging feet fixed to the lower end of said frame structure, an operator's seat and control means at the upper end of said frame structure at one side thereof, and a beam pivot also at the upper end of said frame structure, said frame structure dimensioned to fit between the rear wheels of a tractor and further including means between said feet for attachment to said lift arm thereby to effect vertical movement of said frame structure between a raised position permitting transportation by said tractor, and a lower, fixed ground engaging position;
(b) an extensible boom including an outer sleeve and an inner sleeve movable in said outer sleeve between a retracted and an extended position;
(c) means pivotally connecting said outer sleeve to said beam pivot for arcuate movement about a horizontal and a vertical axis;
(d) means connected to said frame structure and said boom for effecting said arcuate movements;
(e) means within said sleeves for extending and retracting said inner sleeve with respect to said outer sleeve;
(f) a generally horizontally extending head connected to the extended end of said inner sleeve for pivotal movement about a vertically extending axis;
(g) bale engaging elements projecting downwardly from said head and movable in and out of engagement with bales;
(h) and power means for rotating said head about said vertically extending axis from said control means on said frame structure.

12. A device as recited in claim 11 wherein said power means includes means for rotating said head in either direction, the amount of rotation possible being in excess of 360°.

References Cited by the Examiner
UNITED STATES PATENTS

| | | |
|---|---|---|
| 2,764,306 | 9/1956 | Dorkins. |
| 3,050,196 | 8/1962 | Yates _____ 212—55 |
| 3,187,905 | 6/1965 | Moskopf et al. _____ 212—55 |
| 3,214,033 | 10/1965 | Nilsson _____ 212—55 |

FOREIGN PATENTS

| | | |
|---|---|---|
| 1,122,682 | 1/1962 | Germany. |
| 175,300 | 5/1961 | Sweden. |

EVON C. BLUNK, *Primary Examiner.*
A. L. LEVINE, H. C. HORNSBY, *Assistant Examiners.*